(12) United States Patent
Tu et al.

(10) Patent No.: US 11,330,654 B2
(45) Date of Patent: May 10, 2022

(54) METHODS FOR PERFORMING MOBILITY PROCEDURE IN NSA MODE AND COMMUNICATIONS APPARATUS UTILIZING THE SAME

(71) Applicant: MEDIATEK INC., Hsin-Chu (TW)

(72) Inventors: Tsung-Wei Tu, Hsinchu (TW); Yen-Chih Yang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/035,744

(22) Filed: Sep. 29, 2020

(65) Prior Publication Data

US 2021/0120609 A1    Apr. 22, 2021

Related U.S. Application Data

(60) Provisional application No. 62/924,255, filed on Oct. 22, 2019.

(51) Int. Cl.
| | |
|---|---|
| *H04W 8/08* | (2009.01) |
| *H04W 76/15* | (2018.01) |
| *H04W 76/27* | (2018.01) |
| *H04W 36/32* | (2009.01) |
| *H04W 24/10* | (2009.01) |
| *H04W 8/24* | (2009.01) |
| *H04W 84/04* | (2009.01) |

(52) U.S. Cl.
CPC ............. *H04W 76/15* (2018.02); *H04W 8/08* (2013.01); *H04W 8/24* (2013.01); *H04W 24/10* (2013.01); *H04W 36/32* (2013.01); *H04W 76/27* (2018.02); *H04W 84/042* (2013.01)

(58) Field of Classification Search
CPC ....... H04W 76/15; H04W 8/08; H04W 76/27; H04W 36/32; H04W 24/10; H04W 8/24; H04W 84/042; H04W 36/0085; H04W 48/16; H04W 48/20; H04W 36/00835; H04W 36/0061; H04W 76/10
See application file for complete search history.

(56) References Cited

U.S. PATENT DOCUMENTS

| | | | |
|---|---|---|---|
| 2018/0092085 A1* | 3/2018 | Shaheen | H04W 36/14 |
| 2020/0137816 A1* | 4/2020 | Zhao | H04W 48/16 |

* cited by examiner

*Primary Examiner* — Chuong A Ngo
(74) *Attorney, Agent, or Firm* — Winston Hsu

(57) ABSTRACT

A communications apparatus includes a radio transceiver transmitting or receiving wireless signals in a wireless network and a processor. The processor is configured to perform operations comprising: storing cell information of a Long Term Evolution (LTE) cell supporting Evolved Universal Terrestrial Radio Access (EUTRA)-New Radio (NR) Dual Connectivity (EN-DC); and performing a mobility procedure to camp on the LTE cell according to the stored cell information of the LTE cell supporting EN-DC.

14 Claims, 5 Drawing Sheets

METHODS FOR PERFORMING MOBILITY PROCEDURE IN NSA MODE AND COMMUNICATIONS APPARATUS UTILIZING THE SAME

CROSS REFERENCE TO RELATED APPLICATIONS

This application claims the benefit of U.S. Provisional Application No. 62/924,255 filed 2019 Oct. 22, the entirety of which is incorporated by reference herein.

BACKGROUND

The fifth generation (5G) communication standard is the next generation communication standard of LTE (Long Term Evolution) and LTE-Advanced. One purpose of the new radio (NR) access technology in the fifth generation is to realize tight interworking between the LTE system and the LTE-Advanced system and the NR system. As a technology candidate for realizing this close cooperation, dual connectivity by an LTE system or an LTE-Advanced system (hereinafter referred to as an LTE system) and an NR system is considered.

In Evolved Universal Terrestrial Radio Access (EUTRA)-NR Dual Connectivity (EN-DC), LTE would become a Master Cell Group (MCG) and NR would become a Secondary Cell Group (SCG). MCG works as the anchor and UE performs initial registration to this anchor cell group, and this anchor cell adds one or more secondary cells. Therefore, for NR non-standalone (NSA) mode, UE camps on LTE cell first and wait for the network to configure EN-DC on NR cell.

As 5G has become more and more popular, users prefer to use 5G service rather than legacy RAT such as LTE, Universal Mobile Telecommunications System (UMTS) or Global System for Mobile (GSM). Therefore, a method for facilitating an NSA UE to camp on a LTE cell supporting EN-DC is highly required.

SUMMARY

It is an objective of the invention to facilitate an NSA UE to camp on a LTE cell supporting EN-DC when performing a mobility procedure.

According to an embodiment of the invention, a communications apparatus comprises a radio transceiver transmitting or receiving wireless signals in a wireless network and a processor coupled to the radio transceiver. The processor is configured to perform operations comprising: storing cell information of a Long Term Evolution (LTE) cell supporting Evolved Universal Terrestrial Radio Access (EUTRA)-New Radio (NR) Dual Connectivity (EN-DC); and performing a mobility procedure to camp on the LTE cell according to the stored cell information of the LTE cell supporting EN-DC.

According to another embodiment of the invention, a method for performing mobility procedure in non-standalone (NSA) mode comprises: storing cell information of a Long Term Evolution (LTE) cell supporting Evolved Universal Terrestrial Radio Access (EUTRA)-New Radio (NR) Dual Connectivity (EN-DC); and performing a mobility procedure to camp on the LTE cell according to the stored cell information of the LTE cell supporting EN-DC.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
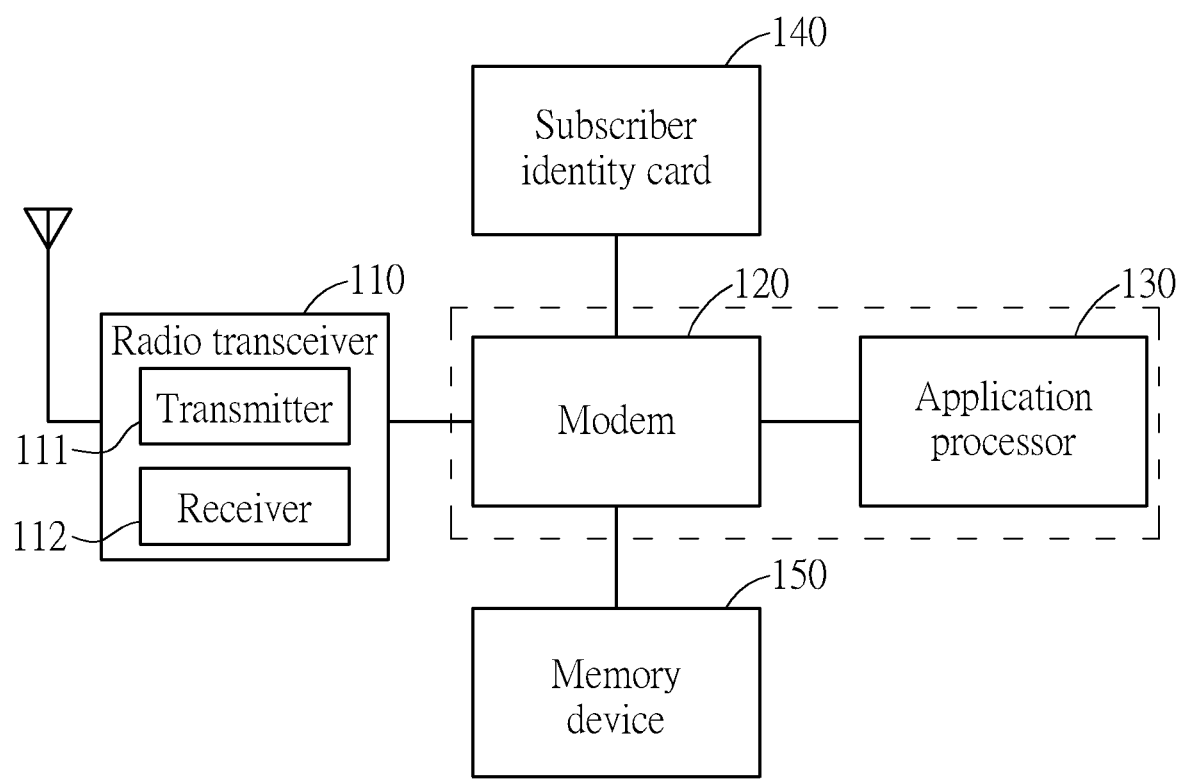
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may comprise a receiver 112 configured to receive wireless signals from an air interface via the antenna module and a transmitter 111 configured to transmit wireless signals to the air interface via the antenna module, and the radio transceiver 110 may be configured to perform RF signal processing. For example, the receiver 112 may convert the received signals into intermediate frequency (IF) or baseband signals to be processed, or transmitter 111 may receive the IF or baseband signals from the modem 120 and convert the received signals into wireless signals to be transmitted to a network device in an access network (e. g. a cellular network or a wireless local access network). According to an embodiment of the invention, the network device may be a cell, a node B, an evolved node B (eNB), a g node B (gNB), a base station, a Mobility Management Entity (MME), an Access and Mobility Management Function (AMF) device, an access point (AP), etc., at the network side and communicating with the communications apparatus 100 via the wireless signals.

The transmitter 111 and the receiver 112 of the radio transceiver 110 may comprise a plurality of hardware devices to perform radio frequency (RF) conversion and RF signal processing. For example, the transmitter 111 and/or the receiver 112 may comprise a power amplifier for amplifying the RF signals, a filter for filtering unwanted portions of the RF signals and/or a mixer for performing radio frequency conversion. According to an embodiment of the invention, the radio frequency may be, for example, the frequency of any specific frequency band for a LTE system, or the frequency of any specific frequency band for a 5G NR system, the frequency of any specific frequency band for a WiFi system, etc.

The modem 120 may be configured to handle corresponding communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different RATs and processing the corresponding RF, IF or baseband signals in compliance with the corresponding communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
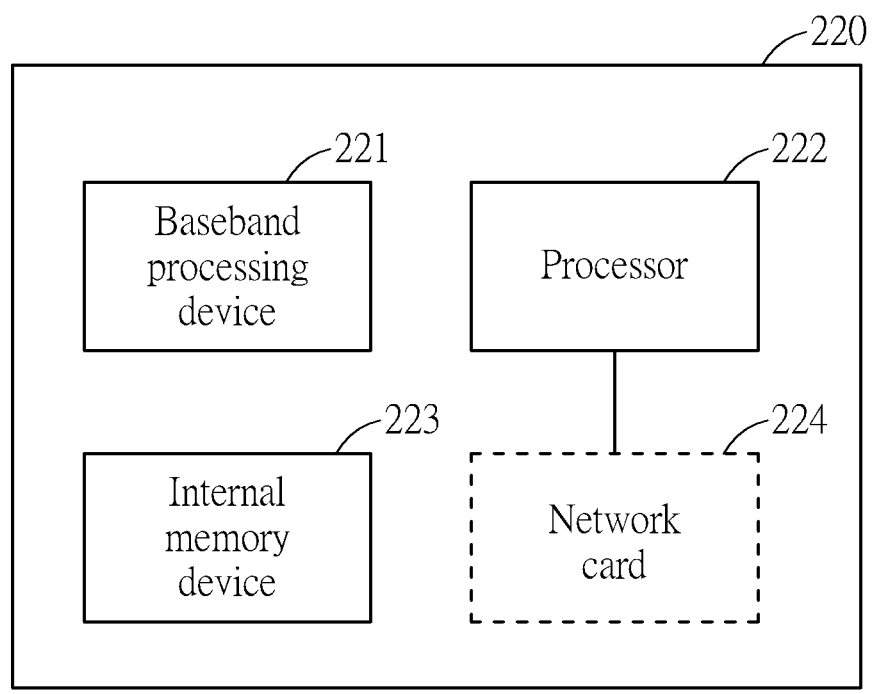
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations for different RATs and processing the corresponding IF or baseband signals in compliance with the corresponding communications protocols, so as to support the multi-RAT wireless communications. According to another embodiment of the invention, the baseband processing device 221 may comprise a plurality of sub-units, each being designed to have the capability of handling the baseband signal processing operations of one or more specific RATs and processing the corresponding IF or baseband signals in compliance with the corresponding communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In an embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or multiple such processing units, for supporting multi-RAT operations. Therefore, the invention should not be limited to what is shown in FIG. 2.

According to an embodiment of the invention, the processor 222 may comprise a plurality of logics, each, designed for handling one or more functionalities. The logics may be configured to execute the program codes of one or more software and/or firmware modules, thereby performing the corresponding operations. When performing the corresponding operations by executing the corresponding programs, the logics may be regarded as dedicated hardware devices or circuits, such as dedicated processor sub-units.

Generally, when the communications apparatus 100 enters a wireless network, for example, when the communications apparatus 100 is supplied with power and then powered on, the communications apparatus 100 may first perform a cell search and a cell selection procedure to synchronize time and frequency with at least one cell and camp on that cell when some predefined camp-on conditions are satisfied. When the communications apparatus 100 has camped on one cell, the cell becomes a serving cell that provides wireless communications services for the communications apparatus 100, and the communications apparatus 100 may receive not only System Information (SI) but also paging from the serving cell.

The communications apparatus 100 and the serving cell may further establish a connection, for example, a Radio Resource Connection (RRC) connection, for message exchange. During the connection establishment procedure, the communications apparatus 100 may perform an attach procedure to attach to the network. The communications apparatus 100 cannot arbitrary leave the network when the communications apparatus 100 has attached to the network.

Before camping on a serving cell and/or establishing the RRC connection with the serving cell, it is hard for the communications apparatus 100 to know whether the serving cell, for example, a Long Term Evolution (LTE) cell, has the capability to support EUTRA-NR Dual Connectivity (EN-DC). However, as 5G has become more and more popular, users prefer to use 5G service rather than legacy RAT such as LTE, UMTS or GSM. Therefore, how to facilitate a NSA UE to try to camp on a LTE cell supporting EN-DC prior than other cells for providing better user experience in a mobility procedure in NSA mode is an issue worth to be concerned.

Figure 3:
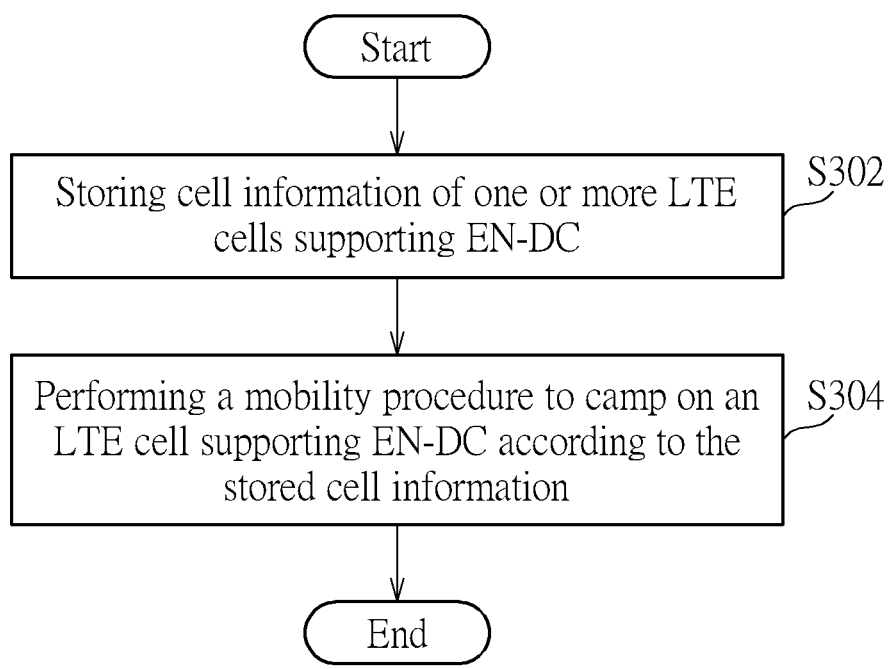
FIG. 3 is a flow chart of a method for performing mobility procedure in NSA mode according to an embodiment of the invention.

FIG. 3 is a flow chart of a method for performing mobility procedure in NSA mode according to an embodiment of the invention. According to an embodiment of the invention, to facilitate a NSA UE to camp on a LTE cell supporting EN-DC, the processor 222 of the communications apparatus 100 may be configured to perform operations comprising:

Step S302: storing cell information of one or more LTE cells supporting EN-DC.

Step S304: performing a mobility procedure to camp on an LTE cell supporting EN-DC according to the stored cell information of the one or more LTE cells supporting EN-DC.

According to an embodiment of the invention, the processor 222 may store the cell information of an LTE cell supporting EN-DC in response to a message indicating that the LTE cell supports EN-DC.

According to an embodiment of the invention, the message may be a broadcast system information block (SIB), such as the SystemInformationBlock2 (SIB2). The LTE cell may broadcast a specific parameter, such as an upperLayerIndication-r15 parameter, in the SystemInformationBlock2 to notify the communications apparatus 100 that the LTE cell has the EN-DC capability.

According to another embodiment of the invention, the message may include a dedicated signaling message received from the LTE cell, such as an RRCConnectionReconfiguration message, after the RRC connection has been established. The LTE cell may transmit an RRCConnectionReconfiguration message carrying a MeasObjectNR information element (IE) to configure the communications apparatus 100 to measure signal quality of an NR cell or an NR frequency.

According to yet another embodiment of the invention, the message may include a dedicated signaling message received from the LTE cell, such as an RRCConnectionReconfiguration message, after the RRC connection has been established. The LTE cell may transmit an RRCConnectionReconfiguration message carrying a RadioResourceConfigDedicated IE with a scg-Configuration field to add a radio bearer connecting to an NR cell for the communications apparatus 100.

According to still another embodiment of the invention, the message may include a dedicated signaling message received from the LTE cell, such as an UECapabilityEnquiry message, after the RRC connection has been established. The LTE cell may transmit an UECapabilityEnquiry message carrying an UECapabilityEnquiry-v1510 IE with a requestedFreqBandsNR-MRDC-r15 field to check the EN-DC capability of the communications apparatus 100.

In the embodiments of the invention, in response to a message, such as one of the aforementioned messages, implicitly or explicitly indicating that the LTE cell supports EN-DC, the processor 222 may determine that the LTE cell supports EN-DC, and may store the cell information of the LTE cell supporting EN-DC in an EN-DC database.

Figure 4:
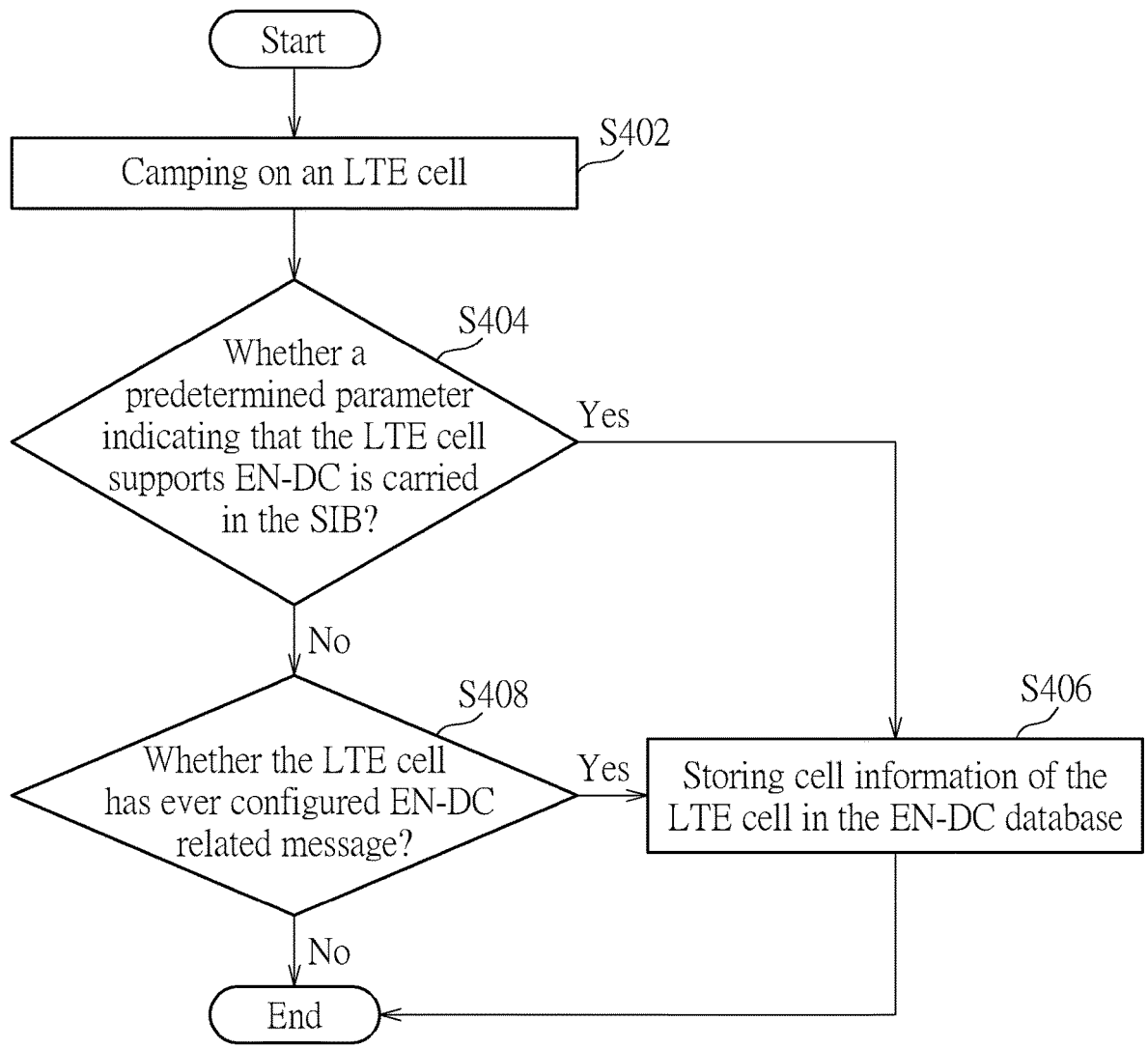
FIG. 4 is a flow chart of a method for updating the EN-DC database according to an embodiment of the invention.

FIG. 4 is a flow chart of a method for updating the EN-DC database according to an embodiment of the invention. The processor 222 of the communications apparatus 100 may be configured to perform operations comprising:

Step S402: camping on an LTE cell.

Step S404: receiving an SIB from the LTE cell and determining whether a predetermined parameter, such as an upperLayerIndication-r15 parameter, implicitly or explicitly indicating that the LTE cell supports EN-DC is carried in the SIB. If yes, step S406 is performed. If no, step S408 is performed.

Step S406: storing cell information of the LTE cell in the EN-DC database.

Step S408: determining whether the LTE cell has ever configured EN-DC related message or whether the LTE cell has ever sent EN-DC related information in connected mode. In the embodiments of the invention, the EN-DC related message may be any dedicated message, such as the aforementioned messages, implicitly or explicitly indicating that the LTE cell supports EN-DC. If yes, step S406 is performed. If no, the process is ended.

In some embodiments of the invention, the processor 222 may further perform some additional operations, comprising that:

Receiving an attach accept message and determining whether a RestrictDCNR bit is set in the attach accept message to notify the communications apparatus 100 that the LTE cell does not support EN-DC for the communications apparatus 100. If the RestrictDCNR bit is set in the attach accept message, the processor 222 may further check whether the cell information of this LTE cell is stored in the EN-DC database. If so, the processor 222 may delete the cell information of this LTE cell from the EN-DC database.

According to an embodiment of the invention, the cell information may comprise one or a combination of a Public Land Mobile Network (PLMN) identifier of the LTE cell supporting EN-DC, a Tracking Area Code (TAC) of the LTE cell supporting EN-DC, an E-UTRA Absolute Radio Frequency Channel Number (EARFCN) or a physical frequency of the LTE cell supporting EN-DC, a Physical Cell Identifier (PCI) of the LTE cell supporting EN-DC and a cell identifier of the LTE cell supporting EN-DC.

In the embodiments of the invention, the EN-DC database may be maintained by the processor 222 based on the system information or the messages received by the communications apparatus 100, and may be utilized when the communications apparatus 100 performs a mobility procedure as in step S304.

In some embodiments of the invention, with the aid of the cell information stored in the EN-DC database, the communications apparatus 100 may select and camp on an LTE cell supporting EN-DC via the mobility procedure when a current serving cell of the communications apparatus 100 does not support EN-DC.

In other embodiments of the invention, with the aid of the cell information stored in the EN-DC database, the communications apparatus 100 may keep staying in the same LTE cell or select and camp on another LTE cell which also supports EN-DC via the mobility procedure when the communications apparatus 100 already camped on an LTE cell supporting EN-DC.

According to the embodiments of the invention, the mobility procedure may be a cell selection procedure, a cell reselection procedure, a redirection procedure, a handover procedure, or the likes.

In the embodiments of the invention, during the aforementioned mobility procedures, or when the communications apparatus 100 performs measurement reporting, the processor 222 may prioritize the LTE cell(s) supporting EN-DC (hereinafter called the EN-DC cell(s) or the EN-DC LTE cell(s)) for increasing the possibility of camping on or staying in the EN-DC cell(s).

Figure 5:
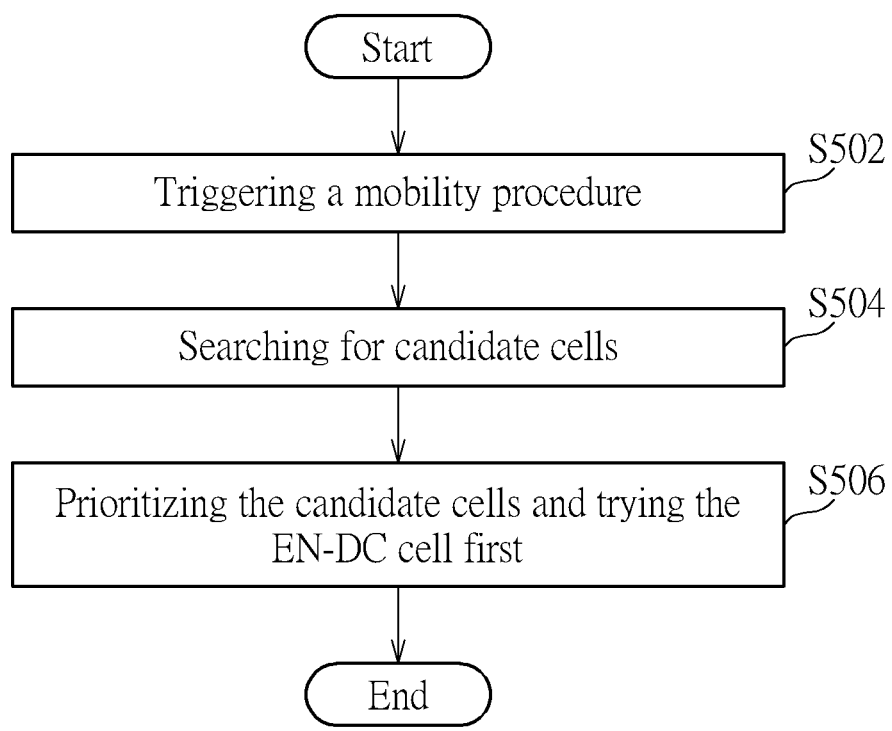
FIG. 5 is a flow chart of a method for performing a mobility procedure by using the EN-DC database according to an embodiment of the invention.

FIG. 5 is a flow chart of a method for performing a mobility procedure by using the EN-DC database according to an embodiment of the invention. The processor 222 of the communications apparatus 100 may be configured to perform operations comprising:

Step S502: triggering a mobility procedure. Different procedures may be triggered based on different conditions, and the condition for triggering a mobility procedure may be configured by the serving cell or defined by the standards. In the embodiments of the invention, when determining at least one condition for triggering a mobility procedure is met, the processor 222 may start performing the mobility procedure.

Step S504: searching for candidate cells. According to an embodiment of the invention, the processor 222 may collect or search for candidate cells based on a stored cell list, the SI collected from different cells, and/or the suggested cell list instructed by the serving cell.

Step S506: prioritizing the candidate cells and trying the EN-DC cell first. According to an embodiment of the invention, the processor 222 may check whether each candidate cell or its corresponding frequency is recorded in the EN-DC database and prioritize the candidate cells, so that the EN-DC cell(s) may have higher priority than other cells. In some embodiments, the processor 222 may also add one or more EN-DC cells recorded in the EN-DC database but not suggested or instructed by the serving cell into the candidate cells and prioritize the cells. In this manner, the processor 222 may try to camp on the EN-DC cell first in the mobility procedure.

According to a first embodiment of the invention, the mobility procedure may be a cell selection procedure and the processor 222 may select an EN-DC cell according to the cell information stored in the EN-DC database and camp on the EN-DC cell when performing the cell selection procedure. To be more specific, the processor 222 may generate a list of candidate frequencies or a list of candidate cells in which the EN-DC cells and the corresponding frequencies have higher priority than other cells and frequencies. The processor 222 may start from the cell having the highest priority in the list and try to camp on the cell, so as to increase the possibility of camping on an EN-DC cell.

According to a second embodiment of the invention, the mobility procedure may be a cell reselection procedure and the processor 222 may select an EN-DC cell according to the cell information stored in the EN-DC database and camp on the EN-DC cell when performing the cell reselection procedure.

To be more specific, after camping on a serving cell, the serving cell may configure one or more neighbor cells to be monitored, and the processor 222 may measure the neighbor cells based on the configuration. The serving cell may further assign a corresponding measurement priority to a configured neighbor cell. For the case when the serving cell is not an EN-DC cell but at least one configured neighbor cell is an EN-DC cell recorded in the EN-DC database, the processor 222 may increase the corresponding measurement priority of the configured neighbor cell supporting EN-DC by itself, so that the measurement of the configured neighbor cell supporting EN-DC will be triggered easier and the possibility of reselecting to the EN-DC cell may be increased. Except for increasing the corresponding measurement priority, the processor 222 may add a predetermined offset to a corresponding measurement result of the configured neighbor cell supporting EN-DC. In this manner, the possibility of reselecting to the EN-DC cell may also be increased. Note that for a configured neighbor cell supporting EN-DC, the processor 222 may increase the corresponding measurement priority and add a predetermined offset to the corresponding measurement result of the configured neighbor cell as well when performing measurement.

On the other hand, for the case when the serving cell is already an EN-DC cell, the processor 222 may increase the corresponding measurement priority of the serving cell or directly regard it as the highest priority cell, so that the measurement of the other neighbor cells will be less easily triggered. In addition, the processor 222 may also add a predetermined offset to a corresponding measurement result of the serving cell. In this manner, the possibility of reselecting to other neighbor cell may be decreased.

According to a third embodiment of the invention, the mobility procedure may be a cell redirection procedure and the processor 222 may select an EN-DC cell according to the cell information stored in the EN-DC database and redirect to the EN-DC cell when performing the cell redirection procedure. The serving cell may indicate a radio access technology (RAT) and a frequency to be redirected in redirection information and carry the redirection information in a predetermined message. Generally, upon receiving the predetermined message, a communication apparatus will trigger a cell redirection procedure and try to redirect to the RAT and frequency indicated by the serving cell.

However, according to an embodiment of the invention, upon receiving the predetermined message carrying the redirection information, the processor 222 may try to redirect to an EN-DC cell recorded in the EN-DC database first rather than trying to redirect to the RAT and frequency indicated by the serving cell, especially when the frequency indicated by the serving cell does not support EN-DC. In this manner, the possibility of redirecting to the EN-DC cell may be increased.

According to a fourth embodiment of the invention, the mobility procedure may be a handover procedure and the processor 222 may select an EN-DC cell according to the cell information stored in the EN-DC database and handover from a serving cell to the EN-DC cell when performing the handover procedure.

To be more specific, for the case when the serving cell is not an EN-DC cell (i.e. does not support EN-DC), the processor 222 may perform measurement on the serving cell and one or more candidate cells comprising an EN-DC LTE cell and obtain a first measured value of the EN-DC LTE cell, adjust the first measured value to obtain a second measured value different from the first measured value, and report the second measured value as a measurement result of the EN-DC LTE cell to the serving cell. In the embodiments of the invention, the second measured value may indicate a measurement result or a signal quality that is better than the first measured value. For example, the processor 222 may add a predetermined offset to the first measured value of the EN-DC LTE cell to obtain the second measured value. In this manner, the possibility of handover to the EN-DC LTE cell may be increased.

On the other hand, for the case when the serving cell is already an EN-DC cell, the processor 222 may perform measurement on the serving cell and one or more candidate cells and obtain a third measured value of the serving cell, adjust the third measured value to obtain a fourth measured value different from the third measured value, and report the fourth measured value as a measurement result of the serving cell to the serving cell. In the embodiments of the invention, the fourth measured value is better than the third measured value. For example, the processor 222 may add a predetermined offset to the third measured value of the serving cell to obtain the fourth measured value. In this manner, the possibility of handover to another cell may be decreased.

Similarly, in some other embodiments of the invention, when the communications apparatus 100 performs measurement reporting, the processor 222 may also add a predetermined offset to measured value of the EN-DC cell(s) recorded in the EN-DC database as the measurement result thereof, so as to make the serving cell believe that the EN-DC cell(s) have good or sufficient signal quality and thereby increasing the possibility of camping on or staying in the EN-DC cell(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications apparatus, comprising:
a radio transceiver, transmitting or receiving wireless signals in a wireless network; and
a processor, coupled to the radio transceiver and configured to perform operations comprising:
storing cell information of a Long Term Evolution (LTE) cell supporting Evolved Universal Terrestrial Radio Access (EUTRA)-New Radio (NR) Dual Connectivity (EN-DC); and
performing a mobility procedure to camp on the LTE cell according to the stored cell information of the LTE cell supporting EN-DC,
wherein storing the cell information of the LTE cell supporting EN-DC includes:
storing the cell information of the LTE cell supporting EN-DC in response to a message indicating that the LTE cell supports EN-DC, wherein the message includes a dedicated signaling message received from the LTE cell.

2. The communications apparatus of claim 1, wherein the message is an RRCConnectionReconfiguration message carrying a MeasObjectNR information element (IE) or a RadioResourceConfigDedicated IE with a scg-Configuration field.

3. The communications apparatus of claim 1, wherein the message is an UECapabilityEnquiry message carrying an UECapabilityEnquiry-v1510 IE with a requestedFreqBandsNR-MRDC-r15 field.

4. The communications apparatus of claim 1, wherein the cell information comprises one or a combination of a Public Land Mobile Network (PLMN) identifier of the LTE cell, a Tracking Area Code (TAC) of the LTE cell, an E-UTRA Absolute Radio Frequency Channel Number (EARFCN) or a physical frequency of the LTE cell, a Physical Cell Identifier (PCI) of the LTE cell and a cell identifier of the LTE cell.

5. The communications apparatus of claim 1, wherein the mobility procedure is a handover procedure to handover from a serving cell to the LTE cell.

6. The communications apparatus of claim 5, wherein the processor is further configured to perform operations comprising:
performing measurement on the serving cell and one or more candidate cells comprising the LTE cell to obtain a first measured value of the LTE cell;
adjusting the first measured value to obtain a second measured value different from the first measured value; and
reporting the second measured value as a measurement result of the LTE cell to the serving cell.

7. The communications apparatus of claim 5, wherein the serving cell does not support EN-DC.

8. A method for performing mobility procedure in non-standalone (NSA) mode, comprising:

storing cell information of a Long Term Evolution (LTE) cell supporting Evolved Universal Terrestrial Radio Access (EUTRA)-New Radio (NR) Dual Connectivity (EN-DC); and performing a mobility procedure to camp on the LTE cell according to the stored cell information of the LTE cell supporting EN-DC, wherein the cell information of the LTE cell supporting EN-DC is stored in response to a message indicating that the LTE cell supports EN-DC, and wherein the message includes a dedicated signaling message received from the LTE cell.

9. The method of claim 8, wherein the message is an RRCConnectionReconfiguration message carrying a MeasObjectNR information element (IE) or a RadioResourceConfigDedicated IE with a scg-Configuration field.

10. The method of claim 8, wherein the message is an UECapabilityEnquiry message carrying an UECapabilityEnquiry-v1510 IE with a requestedFreqBandsNR-MRDC-r15 field.

11. The method of claim 8, wherein the cell information comprises one or a combination of a Public Land Mobile Network (PLMN) identifier of the LTE cell, a Tracking Area Code (TAC) of the LTE cell, an E-UTRA Absolute Radio Frequency Channel Number (EARFCN) or a physical frequency of the LTE cell, a Physical Cell Identifier (PCI) of the LTE cell and a cell identifier of the LTE cell.

12. The method of claim 8, wherein the mobility procedure is a handover procedure to handover from a serving cell to the LTE cell.

13. The method of claim 12, further comprising:

performing measurement on the serving cell and one or more candidate cells comprising the LTE cell to obtain a first measured value of the LTE cell;

adjusting the first measured value to obtain a second measured value different from the first measured value; and reporting the second measured value as a measurement result of the LTE cell to the serving cell.

14. The method of claim 12, wherein the serving cell does not support EN-DC.

* * * * *